Patented June 13, 1939

2,161,951

UNITED STATES PATENT OFFICE 2,161,951

PHENOL-MODIFIED RESINS FROM CRUDE SOLVENT NAPHTHA

William H. Carmody, Pittsburgh, Pa., assignor to The Neville Company, Pittsburgh, Pa., a corporation of Pennsylvania No Drawing. Application January 21, 1938, Serial No. 186,140

3 Claims. (Cl. 260—81)

This invention relates to improvements in phenol-modified resins produced from crude solvent naphtha, especially phenol-modified coumarone resins, and it is among the major objects of the invention to improve certain properties of such resins to render them more useful in the arts and without substantial depreciation of the desirable properties which they inherently possess.

Crude solvent naphthas produced, for example, in the by-product coking of coal, contain polymerizable constituents which may be predominantly of the coumarone-indene type, or of the dicyclopentadiene type, according to the proximate source from which the naphthas are derived. Procedures for effecting the polymerization of those materials into useful resins are known and used in the art, for which reason they need not be specifically detailed herein. Although the resins produced possess various properties which render them especially desirable for uses to which resins are put, these resins are characterized by substantial insolubility in the solvent alcohols used commercially, although alcohol solubility can be conferred by phenolic involvement, or modification, of the resins during polymerization.

A procedure for phenolic modification of these resins is described in German Patent No. 302,543, and improved procedures for accomplishing this are described and claimed in Patent No. 2,077,009 to Joseph Rivekin, granted April 13, 1937, and in a copending application Serial No. 89,847, filed July 9, 1936, by Joseph Rivkin. In accordance with the procedure of Patent No. 2,077,009 to Joseph Rivkin phenol-modified resin is produced by polymerizing the polymerizable constituents of crude solvent naphtha in the presence of a phenolic substance, such as cresols, phenols, naphthols, and the like, which is reactive with the resin-forming constituents. In the practice of that invention the polymerization is effected by means of activated clay and with moderately elevated temperature, for instance in the neighborhood of 100° C., the reaction body being agitated during the course of the reaction.

In accordance with the invention of the aforesaid application Serial No. 89,847, the phenolic involvement is achieved through the conjoint use of a sulfuric acid base catalyst and of phenolic reagent in a quantity by weight not less than about 22 per cent of the weight of the polymerizable constitutnets of the crude solvent naphtha.

During the progress of the reaction the liquid body is agitated and its temperature is maintained below about 60° C., most suitably within the range 25 to 35° C. The term "sulfuric acid base catalyst" is used to refer concisely to concentrated sulfuric acid or derivatives of sulfuric acid obtained by the substitution of at least one hydrogen atom or one hyroxyl group of the sulfuric acid by an aliphatic or an aromatic group which may, in turn, be substituted by other groups, such as hydroxyl groups, amine groups, and the like. This latter procedure results, in general, in products having a lower acid number than characterizes the phenol-modified resins produced in accordance with the procedure of the aforementioned patent.

It is characteristic of all of these resin products that they possess to a marked extent solubility in alcohol, and particularly is this true of the phenol-modified resins made in accordance with the aforesaid inventions, which are also compatible with cellulose nitrate. By virtue of these properties these phenol-modified resins are suited to commercial uses requiring resins having such characteristics. For instance, the alcohol solubility of these resins not only permits their use in making varnishes, but the phenolic involvement additionally serves in some manner to inhibit gas checking during the drying of a varnish film comprising such resin, as disclosed and claimed in Patent No. 2,094,331, granted September 28, 1937, to Joseph Rivkin. Likewise, the compatibility of resins produced according to the aforesaid inventions renders their use possible with cellulose nitrate in making plastics and other products therefrom.

Despite the desirable properties of such resins, such as their resistance to dilute acids and alkalies, good film-forming characteristics, compatibility with cellulose nitrate, solubility in alcohols, and others, these phenol-modified resins as produced heretofore have been unsuited to certain uses because in general they are rather strongly colored and possess a distinctive odor which may be objectionable for some purposes. I have discovered, and it is upon this that the present invention is predicated, that these undesirable properties of phenol-modified solid resins resultant from crude solvent naphtha may be diminished or eliminated without materially depreciating the desirable properties inherent in such resins, by hydrogenation of the resin. In other words, I have discovered that by hydrogenation of the normally solid phenol-modified resins, the color and odor may be improved, even to the point where the hydrogenated product is substantially colorless and odorless, while the melting point is not decreased, even with far-reaching hydrogenation, thus insuring solid resin product.

In the practice of the invention the resin is dissolved in a suitable solvent and the solution is subjected to hydrogen in the presence of an effective hydrogenation catalyst, suitably under conditions of elevated temperature and pressure, the hydrogenation being carried out for such period of time as to effect hydrogenation to the desired degree.

The following actual run is illustrative of the benefits to be derived from and of the procedure used in the practice of the present invention. In this run there was used a phenol-modified coumarone-indene resin having a melting point of approximately 95° C. This had a color of about 3 on the customary resin scale, and it possessed a distinctive odor. Its solubility in isopropyl alcohol was below 15° C. measured in the manner customary in this art. Fifty grams of the resin and 80 cc. of petroleum benzene were placed in an autoclave together with 50 grams of Raney nickel catalyst prepared in the manner known in the art. The autoclave was then closed and hydrogen gas was admitted to a pressure of 1050 pounds. Heat was applied slowly to start the hydrogenation, and by the time the temperature was 170° the pressure had dropped to 610 pounds, showing extensive hydrogenation. The pressure was then rebuilt, by introduction of hydrogen, to the original value, and when the pressure within the autoclave showed that the second hydrogen charge had been nearly all absorbed the autoclave was recharged to the initial pressure for the third time. During this time the temperature was progressively increased. At the end of four hours, when the run was completed, the pressure within the autoclave was 1480 pounds and the temperature was 247° C. The solution of resin was separated from the suspended nickel catalyst and the hydrogenated resin recovered by evaporation of the solvent.

The color of the hydrogenated resin was less than ¼, and the resin was susbtantially odorless, while its melting point and specific gravity were not changed appreciably. By treatment with alcohol the resin product could be separated into a portion which was insoluble and a portion which was completely soluble in the alcohol. The latter portion was soluble in all proportions.

The invention resides broadly in my discovery that desirable properties are conferred upon these phenol-modified resins, without material detriment to their inherently desirable properties, by hydrogenation, and it is not restricted to any specific conditions of hydrogenation. That is the temperature and pressure may be related to effect the desired degree of hydrogenation. In general, the rate of hydrogenation will increase with rise in temperature up to an optimum value which generally is encountered somewhat below the temperature at which depolymerization will occur. With this range the hydrogenation may be effected at such temperature as is desired, but obviously temperatures which cause depolymerization will be unsuitable for most purposes. Similarly, the use of pressure in excess of atmospheric is desirable for effecting hydrogenation and to expedite it, but the particular temperature and pressure chosen may be varied according to need or to commercial considerations. Where extensive hydrogenation is not necessary the process may be carried on at room temperature, especially if an efficient catalyst is used. I now prefer to use metallic nickel hydrogenation catalyst of the particular type referred to hereinabove, but where far-reaching hydrogenation is unnecessary, or for other reasons, other metallic hydrogenation catalysts known in the art may be used, as will be understood by those skilled in the art.

In the preferred practice of the invention the phenolic involvement, for instance as described hereinabove, is accomplished with a cresol such as cresylic acid of high boiling point.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. As a new article of manufacture, a solid resin composed of polymers of the polymerizable constituents of crude solvent naphtha resulting from polymerization of said constituents with concurrent involvement with a phenolic substance, and being further modified by hydrogenation and characterized by being substantially colorless and soluble in alcohols.

2. As a new article of manufacture, a solid resin composed of polymers of the coumarone-indene constituents of crude solvent naphtha resulting from polymerization of said constituents with concurrent involvement with a phenolic substance, and being further modified by hydrogenation, and characterized by being substantially colorless, odorless, and soluble in alcohols.

3. A product according to claim 2, said phenolic susbtance being a cresol.

WILLIAM H. CARMODY.